United States Patent [19]
Erspamer et al.

[11] 3,992,951
[45] Nov. 23, 1976

[54] COMPENSATED TOROIDAL ACCELEROMETER

[75] Inventors: James R. Erspamer; Howard R. McCombs, both of Phoenix, Ariz.

[73] Assignee: Sperry Rand Corporation, New York, N.Y.

[22] Filed: May 12, 1975

[21] Appl. No.: 576,829

[52] U.S. Cl. .............................. 73/497; 73/516 LM
[51] Int. Cl.² ........................................ G01P 15/08
[58] Field of Search ........... 73/497, 516 LM, 516 R; 33/366; 338/44, 86

[56] References Cited
UNITED STATES PATENTS

| | | | |
|---|---|---|---|
| 2,411,117 | 11/1946 | Scherbatskoy | 73/516 R X |
| 2,713,726 | 7/1955 | Dixson | 33/366 |
| 3,442,023 | 5/1969 | Remington et al. | 33/366 |

*Primary Examiner*—James J. Gill
*Attorney, Agent, or Firm*—Howard P. Terry

[57] ABSTRACT

A toroidal accelerometer having a housing containing an electrolytic fluid at least partially immersing a plurality of electrodes disposed within said housing and an amplifier circuit coupled to the electrodes for providing an output signal indicative of the angle of tilt or rotation of the accelerometer about a reference axis. The accelerometer further includes a circuit connected across the amplifier to prevent polarization of the electrolytic fluid by detecting any d.c. voltage developed by the amplifier circuit and, in response thereto, coupling a compensating signal generated thereby to the amplifier until the d.c. voltage is substantially eliminated.

7 Claims, 3 Drawing Figures

COMPENSATED TOROIDAL ACCELEROMETER

BACKGROUND OF THE INVENTION

1. Field of the Invention

The invention relates to toroidal accelerometers and more particularly to a temperature compensated toroidal accelerometer with means provided to prevent polarization of the electrolytic fluid.

2. Description of the Prior Art

In copending application entitled "Temperature Compensated Toroidal Accelerometer", Ser. No. 524,594, filed on Nov. 18, 1974 in the names of Buckley et al and assigned to the assignee of the present invention, a toroidal accelerometer or tilt sensor is disclosed in which an auxiliary electrode is added for temperature compensation purposes. More particularly, the auxiliary electrode is disposed in the sensor so that it is completely immersed in the electrolytic fluid at all times. Furthermore, the auxiliary electrode is electrically coupled to the output of an amplifier which detected the rotation or tilting about the reference axis.

Prior to the incorporation of this auxiliary electrode, the output of the amplifier was dependent on the temperature related characteristics of the electrolytic fluid. The addition of this auxiliary electrode, in place of a fixed resistance, provided for a temperature dependent parameter in the amplifier circuit which has the effect of cancelling the existing temperature dependent parameter therein.

However, this arrangement is subject to limitations. For example, any d.c. or steady-state potential developed by the amplifier and its output is coupled to the auxiliary electrode and, therefore, to the electrolytic fluid as well. If the d.c. potential reaches an appreciable level, typically in excess of a few hundred millivolts, polarization of the electrolytic fluid begins. If the polarization of the electrolytic fluid is allowed to continue, the accelerometer will be rendered inoperable within a short period of time.

In an attempt to prevent the polarization of the electrolytic fluid, the prior art incorporated a potentiometer to null the d.c. output of the amplifier. However, this technique is sensitive to time, temperature and changes in the impedances between the electrodes within the accelerometer.

SUMMARY OF THE INVENTION

The present invention comprises a toroidal accelerometer including a housing containing a plurality of electrodes at least partially immersed in an electrolytic fluid which are coupled to an amplifier and a circuit to prevent polarization of the electrolytic fluid.

If the accelerometer is rotated or tilted about its reference axis, the electrolytic fluid therein shifts causing a change in the impedances between the electrodes. The amplifier responds to a shift from the null value of the input voltage due to the change in impedances and generates an output signal accordingly.

The circuit to prevent the polarization of the electrolytic fluid detects d.c. voltages at the output of the amplifier, and in response thereto, generates a signal which is coupled to the input of the amplifier until the d.c. potential is effectively eliminated. Furthermore, the circuit is designed to have no effect on the tilt signal of the amplifier.

Additionally, a solid state circuit is incorporated to replace the transformer of the prior art through which, the potential of an a.c. source is accurately coupled to the electrodes.

DESCRIPTION OF THE PREFERRED EMBODIMENT

Figure 1:
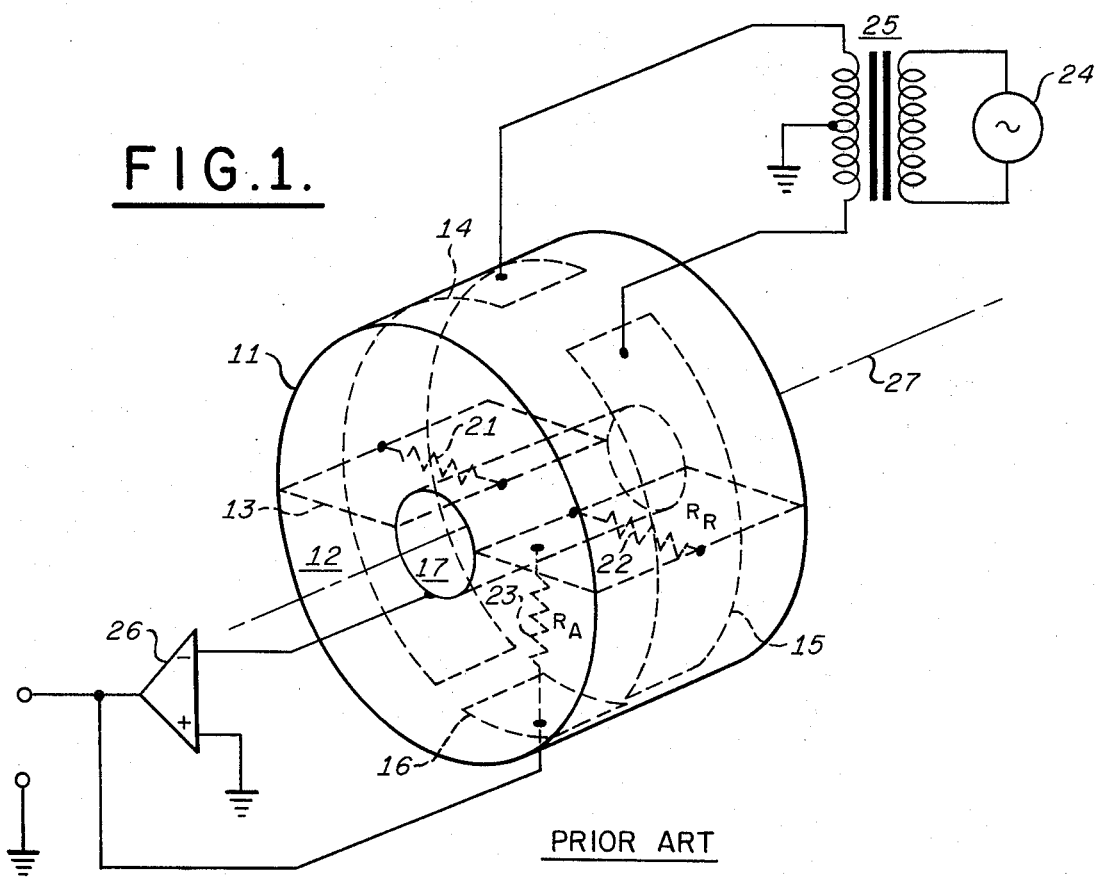
FIG. 1 is a drawing, partly in schematic form and partly in mechanical form, illustrating a prior art toroidal accelerometer.

FIG. 1 illustrates the toroidal accelerometer disclosed in copending application Ser. No. 524,594. A cylindrical housing 11, shown in its normal vertically upright position is filled with an electrolytic fluid 12 to a level 13. The housing 11 also contains two arcuately shaped electrodes 14 and 15, oppositely disposed with respect to each other and affixed to the interior surface of the outer circumference of the housing 11. An arcuately-shaped auxiliary electrode 16 is positioned between the lower extremities of the electrodes 14 and 15 and also affixed to the interior surface of the outer circumference of the housing 11. The common electrode is affixed to the interior surface of the inner circumference of the housing 11 such that electrode 17 is equidistant from electrodes 14, 15 and 16. Resistors 21, 22 and 23, shown in phantom, represent the impedances of the electrolytic fluid 12 between electrodes 14, 15 and 16, respectively, and electrode 17. An a.c. potential source 24, connected to the primary of transformer 25, is coupled to electrodes 14 and 15 by means of the secondary of transformer 25, the center tap of which is grounded. The inverting input of amplifier 26 is connected to the common electrode 17 and the output thereof is connected to the auxiliary electrode 16.

The operation of this toroidal accelerometer is explained in detail in said copending application Ser. No. 524,594. In general, however, the potential developed across the secondary of transformer 25 and applied to electrodes 14 and 15 is measured by the amplifier 26. More particularly, when the accelerometer is in its normal position, resistance 21 will equal resistance 22, that is, the impedance between electrode 14 and electrode 17 will equal the impedance between electrode 15 and electrode 17. While these impedances are equal, the potential at the common electrode 17, as monitored by amplifier 26, will equal zero or a null value. As the accelerometer is tilted or rotated clockwise about the reference axis 27, the proportion of electrode 15 which is immersed in electrolytic fluid 12 will increase while proportion of electrode 14 immersed in electrolytic fluid 12 will correspondingly decrease. The potential, therefore, at electrode 17 will therefore shift from the null value and an indication thereof will be generated at the output of amplifier 26. Similarly, an equal but opposite shift from the null potential will occur for a counterclockwise rotation or tilt about the reference axis 27.

The addition of the auxiliary electrode 16 combined with the electrical coupling thereof to the output of amplifier 26 compensates the toroidal accelerometer with respect to temperature. Specifically, as detailed in copending application Ser. No. 524,594, the incorporation of the impedance 23 into the amplification equation for amplifier 26 introduces a second parameter therein which is temperature dependent on the electrolytic fluid and which will cancel the effects of temperature on the electrolytic fluid in the equation as reflected in impedances 21 and 22. As noted in the description of the prior art, however, the introduction of the auxiliary electrode 16 subjects the electrolytic fluid to any d.c. or steady state potentials which may be developed by the amplifier 26 and the accompanying polarization resulting therefrom.

Figure 2:
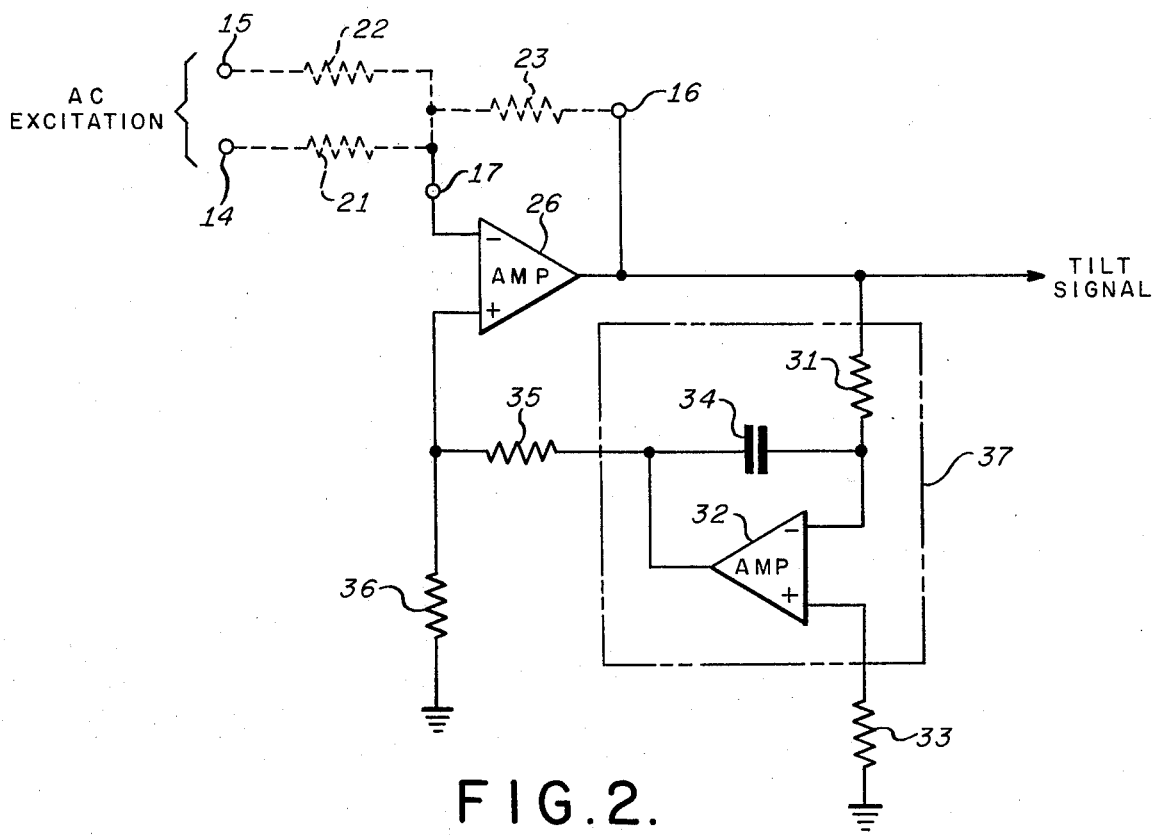
FIG. 2 is a schematic diagram illustrating the circuit of the present invention which prevents the polarization of the electrolytic fluid within the accelerometer.

FIG. 2 depicts the circuit 30 of the present invention incorporated to prevent polarization of the electrolytic fluid 12. Electrodes 14, 15, 16 and 17, and the impedances therebetween (21, 22 and 23) are coupled to amplifier 26 in similar fashion to that depicted in FIG. 1. Additionally, a resistor 31 is connected between the output and amplifier 26 and the inverting input of operational amplifier 32. A resistor 33 is connected between ground and the non-inverting input of amplifier 32. A capacitor 34, preferably non-polarized, is coupled between the inverting input and the output of operational amplifier 32 while a resistor 35 is connected between the output of operational amplifier 32 and the junction of grounded resistor 36 and the non-inverting input of amplifier 26.

Amplifier 32 in combination with resistor 31 and capacitor 34 comprises an integrator circuit 37 with which to integrate any d.c. output of amplifier 26. In response to such a d.c. output, a signal will be generated at the output of amplifier 32 which, after being coupled through a resistor-divider network comprising resistors 35 and 36, is coupled to the non-inverting input of amplifier 26. The application of this output signal from amplifier 32 to the non-inverting input of amplifier 26 will drive the output of amplifier 26 towards zero volts d.c. Furthermore, the output from amplifier 32 will continue to drive amplifier 26 until zero volts d.c. is effectively reached.

The RC time constant of integrator 37 (the values of resistance of resistor 31 and the capacitance of capacitor 34) is designed to be very large with respect to the period of the frequency of the output signal from amplifier 26 representing the tilt of the accelerometer about the reference axis 27. For example, if the frequency of the a.c. potential source 24 is approximately 5.0 KHz, a typical set of values for resistor 31 and capacitor 34 would be $10^4$ ohms and 2.2 microfarads, respectively. With this configuration, the a.c. voltage gain of amplifier 26 is established by the impedances between the electrodes, as desired, while the d.c. voltage gain of amplifier 26 approaches zero.

Figure 3:
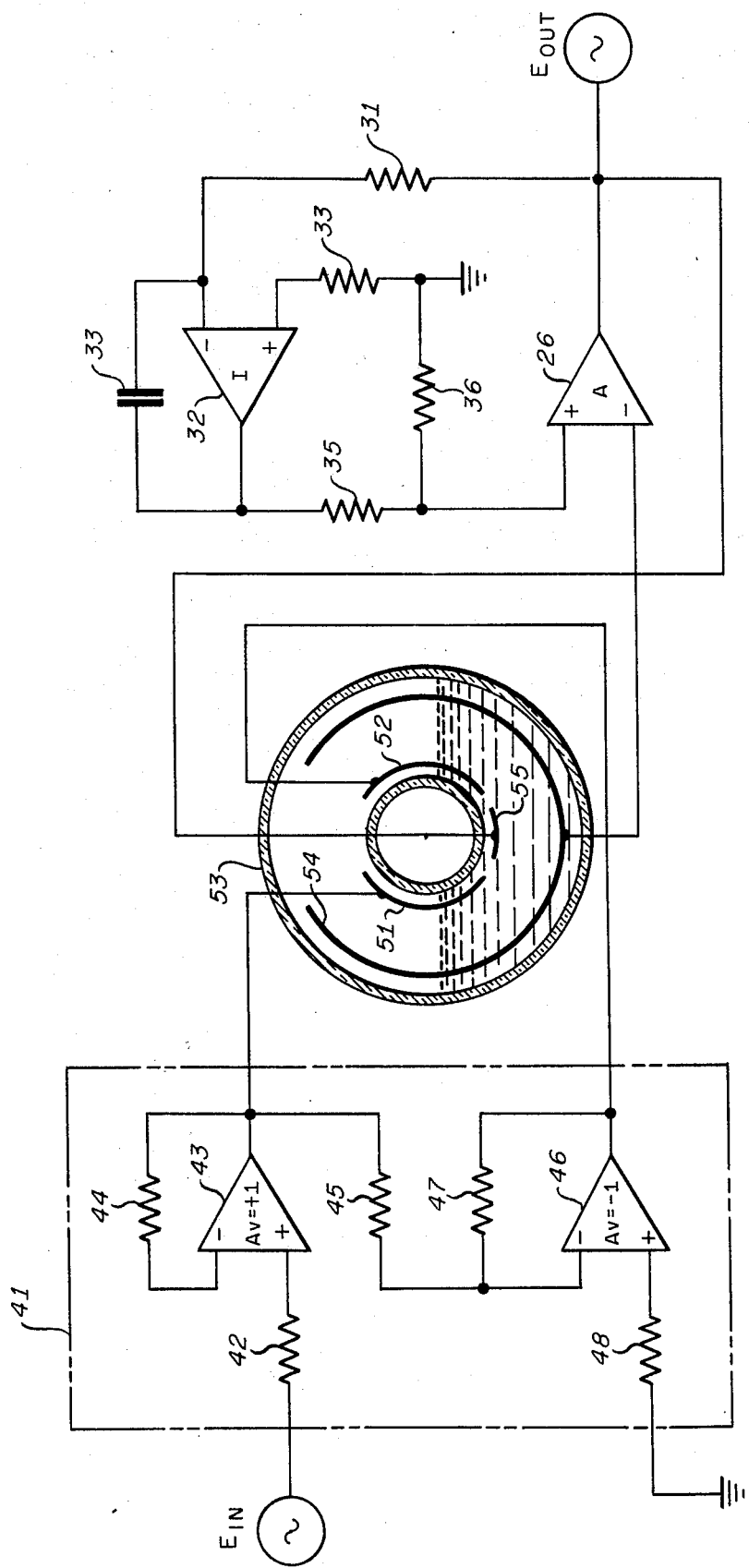
FIG. 3 is a schematic diagram illustrating a complete toroidal accelerometer encompassing the present invention.

FIG. 3 depicts the implementation of the present invention in a complete toroidal accelerometer. In particular, FIG. 3 depicts the incorporation of a solid state circuit 41 which replaces the transformer 25 of the prior art.

The a.c. source 24 is coupled between the input terminal $E_{IN}$ and ground. A resistor 42 is connected between the input terminal $E_{IN}$ and the non-inverting input of amplifier 43 while a second resistor 44 is connected between the output and the inverting input of amplifier 43. Resistor 45 is connected between the output of amplifier 43 and the junction of the inverting input of amplifier 46 and resistor 47. The remaining lead of resistor 47 is connected to the output of amplifier 46 while the non-inverting input of amplifier 46 is connected to ground through a resistor 48. The output of amplifier 43 is connected to electrode 51 while the output of amplifier 46 is connected to electrode 52.

The housing 53 differs from that of FIG. 1 in that the common electrode 54 is affixed to the interior surface of the outer circumference while the remaining electrodes 51, 52 and 55 are affixed to the interior surface of the inner circumference of the housing. It should be apparent, however, that the two configurations are equivalent with regard to operation and that the housing may encompass still different structures which operate in a similar manner.

Amplifiers 43 and 46 are a pair of precision amplifiers with carefully adjusted gains. Since the inverting input of amplifier 43 is connected only to its own output through resistor 44, its gain must equal +1 as is well known to those skilled in the art. Additionally, if the value of resistor 45 is made to equal the value of resistor 47, the gain of amplifier 46 will equal −1. This configuration insures that ground potential will be maintained at the midpoint or null between the magnitude of the potential on the output of amplifier 43 and the magnitude of the potential on the output of amplifier 46. Therefore, the null potential will be present at electrode 54 as long as the impedances between electrode 54 and electrode 51 and between electrode 54 and electrode 52 are equal. Additionally, the incorporation of this circuit permits the use of a common ground throughout the apparatus.

It will be appreciated that the present invention comprises a temperature-compensated toroidal accelerometer in which means are provided to prevent the polarization of the electrolytic fluid within the housing. Furthermore, the means for preventing polarization has virtually no effect on the tilt signal from the accelerometer and is insensitive to time, temperature and the impedances of the electrodes within the housing. A solid state circuit is also provided for coupling the a.c. source to the electrodes of the accelerometer and thereby reducing the cost, the volume, and the mass of the apparatus.

While the invention has been described in its preferred embodiments, it is to be understood that the words which have been used are words of description rather than limitation and that changes may be made within the purview of the appended claims without departing from the true scope and spirit of the invention in its broader aspects.

We claim:

1. In a toroidal accelerometer including a housing, a plurality of electrode means disposed within said housing, electrolytic fluid means at least partially immersing each of said electrode means and amplifier means having an input coupled to the electrode means for providing at the output thereof a signal indicative of the tilt of the accelerometer about a reference axis, said plurality of electrode means including an electrode means totally immersed in said electrolytic fluid and coupled to the output of said amplifier means for temperature compensating said accelerometer; apparatus for preventing polarization of the electrolytic fluid means without affecting the tilt signal comprising:

circuit means having an input coupled to said amplifier means for detecting any d.c. voltage components developed in said amplifier means and, in response thereto, for coupling a compensating signal to an input of said amplifier means until the d.c. voltage is substantially eliminated.

2. The toroidal accelerometer of claim 1 wherein said circuit means comprises an integrator connected between the output and an input of the amplifier means.

3. The toroidal accelerometer of claim 2 wherein the integrator comprises:
an operational amplifier,
resistor means connected between the output of said amplifier means and the inverting input of the operational amplifier, and
capacitor means connected between the output of the operational amplifier, and said inverting input thereof.

4. The toroidal accelerometer of claim 3 wherein the RC time constant of the resistor and the capacitor means is sufficiently large with respect to the frequency of the tilt signal so that said tilt signal is unaffected by said circuit means.

5. The toroidal accelerometer of claim 1 further including:
an a.c. potential source;
coupling means, connected between the a.c. source and the electrode means, for coupling an a.c. potential to the electrode means with a defined midpoint potential therein.

6. The toroidal accelerometer of claim 5 wherein the coupling means comprises second and third amplifier means having second and third outputs respectively coupled to the electrode means, wherein the gains of said second and third amplifiers, with respect to the a.c. potential source, are equal in magnitude and opposite in polarity.

7. A toroidal accelerometer comprising:
a non-conductive housing defining a generally annular and symmetrical internal configuration about a reference axis;
first and second arcuately-shaped electrode means affixed within said housing and oppositely disposed with respect to each other;
third arcuately-shaped electrode means affixed within said housing and disposed between the extremities of said first and second electrode means;
fourth electrode means affixed within said housing having corresponding portions thereof equidistant from said first, second and third electrode means respectively;
electrolytic fluid means having an impedance characteristic and contained within said housing for partially immersing said first and second electrode means, completely immersing said third electrode means and completely immersing at least the portion of said fourth electrode means corresponding to said third electrode means;
an a.c. potential source;
first and second amplifier means coupled to said a.c. potential source having first and second outputs, respectively, coupled to said first and second electrodes, respectively, wherein the gains of said first and second amplifier means with respect to the a.c. potential source are equal in magnitude and opposite in polarity;
third amplifier means having an input connected to said fourth electrode means and an output connected to said third electrode means for providing an output signal indicative of the tilt of said housing about said reference axis;
circuit means for preventing polarization of said electrolytic fluid means without affecting said tilt signal comprising an integrator coupled between the output and an input of said third amplifier means for detecting a d.c. voltage generated by said third amplifier means and, in response thereto, providing a compensating signal coupled to the input of said third amplifier means until the d.c. voltage is substantially eliminated.

* * * * *